United States Patent [19]

Inoue

[11] Patent Number: 5,068,761
[45] Date of Patent: Nov. 26, 1991

[54] DISK CARTRIDGE WITH NOTCH FOR LOCKING A SHUTTER

[75] Inventor: Yoshihisa Inoue, Saitama, Japan

[73] Assignee: Nakamichi Corporation, Kodaira, Japan

[21] Appl. No.: 507,621

[22] Filed: Apr. 10, 1990

[30] Foreign Application Priority Data

Apr. 25, 1989 [JP] Japan .................................. 1-105300

[51] Int. Cl.⁵ .............................................. G11B 23/03
[52] U.S. Cl. .................................... 360/133.0; 369/291
[58] Field of Search ......................... 360/133; 369/291

[56] References Cited

U.S. PATENT DOCUMENTS 4,546,397 10/1985 Asami et al. ........................ 360/133
4,682,260 7/1987 Oishi et al. ........................... 360/133
4,740,949 4/1988 Davis ................................... 360/133

Primary Examiner—Robert S. Tupper
Attorney, Agent, or Firm—Morrison Law Firm; Thomas R. Morrison

[57] ABSTRACT

A disk cartridge includes a hard jacket having head insert hole. A shutter on the hard jacket is moveable between the open position and the closed position relative to the head insert hole. The front edge of the hard jacket includes a notch defined by at least a bottom wall and a side wall. To make easy the insertion of the disk cartridge into a recording and reproducing apparatus, thereby improving a feeling of operation, the side wall is connected to the front edge by a corner wall whose distance from one side edge of the shutter standing at the open position progressively increases as it approaches the front edge.

4 Claims, 16 Drawing Sheets

DISK CARTRIDGE WITH NOTCH FOR LOCKING A SHUTTER

BACKGROUND OF THE INVENTION

1. Field of the Invention

This invention relates to a disk cartridge whose hard jacket is provided with an openable and closeable shutter that accommodates a disc-shaped recording medium.

2. Description of the Prior Art

Conventional media for magnetic recording use a magnetic disk to provide compatibility and accessibility. To prevent the magnetic disk from being damaged and its recording surface from being soiled during insertion and ejection of the magnetic disk in a recording and reproducing apparatus, a disk cartridge is proposed of the type wherein the magnetic disk is rotatably accommodated in a plastic hard jacket formed with a head window and this head window is covered with an open/close-able shutter. This type of disk cartridge is generally called a 3.5 inch floppy disk cartridge and widely used nowadays.

Recently, in view of a demand for large capacity of recording, attention has been paid to magneto-optical recording instead of magnetic recording. Magneto-optical recording media are used in the form of a disk of magneto-optical material. To protect the magneto-optical disk and prevent its recording surface from being soiled, the magneto-optical disk is accommodated in a disk cartridge having an openable and closeable shutter, as is the case of the foregoing magnetic disk.

FIGS. 13 and 14 are schematic diagrams showing an example of the magneto-optical disk cartridge, whose shutter is in the closed state in FIG. 13 and in the open state in FIG. 14.

A magneto-optical disk cartridge A (hereinafter referred to as the cartridge A) accommodates a magneto-optical disk B. On the side of a front edge H of the cartridge A there is formed a recess D in which a shutter C is seated. An opening E is formed in a central portion of the recess D. The shutter C is supported by a guide mechanism (not shown) so as to slide in the recess D laterally in the drawing, and is always urged by a shutter return spring F toward the closed position shown in FIG. 13. The shutter C is formed with an opening G which, when the shutter moves to the open position shown in FIG. 14 comes into alignment with the opening E. Therefore, when the shutter C stands at the closed position shown in FIG. 13 a recording surface of the magneto-optical disk B is covered with the shutter C, whereas when the shutter C moves to the open position shown in FIG. 14 the opening G comes into alignment with the opening E so that the recording surface of the magneto-optical B is exposed.

Formed at the front edge H of the cartridge A is a notch I for locking the shutter C at the open position.

An example of a shutter operating unit for automatically opening and closing the shutter C of the cartridge A will be described with reference to FIGS. 15 and 16. In these drawings, the solid lines illustrate the positions of individual parts when the shutter C is in the completely open state, whereas the two-dot chain lines illustrate the positions of individual parts when the shutter C is in the completely closed state.

A holder J in which the cartridge A is inserted is lifted by a lifting mechanism (not shown) between the depressed position where it approaches a main chassis K to permit recording and reproducing with respect to the cartridge A and the raised position where it separates from the main chassis K to permit insertion/ejection of the cartridge A. A rotary lever L, rotatable in response to the insertion/ejection of the cartridge A, is rotatably supported at one end via a rotary shaft M by the holder J. Rotary lever urged clockwise by a spring N, and provided at the other end with an engage pin P which is engageable with the shutter C of the cartridge A. A cartridge eject lever Q is rotatably supported at one end via a rotary shaft R by the main chassis K, urged counterclockwise by a spring S, and provided at the other end with a cartridge eject pin T. As will be described later, this cartridge eject lever Q upon its rotation actuates the foregoing lifting mechanism and ejects the cartridge A from inside the holder J.

The operation of insertion/ejection of the cartridge A with respect to the shutter operating unit will be described.

When the cartridge A is gradually inserted into the holder J, the engage pin P of the rotary lever L comes into contact with the front edge of the cartridge A and one side edge $C_1$ of the shutter C at the two-dot chain line position. When the cartridge A is further inserted, the engage pin P is pushed by the front edge H of the cartridge A, the rotary lever L is rotated counterclockwise with the spring N elongated, the side edge $C_1$ of the shutter C is pushed by the engage pin P, and the shutter C is moved leftward in the drawing in opposition to the shutter return spring F. At the solid line position, the engage pin P completely fits in the notch I of the cartridge A, so that the shutter C is locked in the open position.

On the other hand, the eject pin T of the cartridge eject lever Q is pushed by the front edge H of the cartridge A, and the eject lever Q is rotated clockwise in opposition to the spring S and locked at the solid line position by a lock mechanism (not shown). The rotation of the eject lever Q actuates the lifting mechanism, so that the holder J is moved from the raised position to the depressed position. Here, as shown in FIG. 16 in greater detail, the operation of rotation of the cartridge eject lever Q is caused when the cartridge A is inserted after the complete opening of the shutter C subsequent to the halfway falling of the engage pin P in the notch I, or when the cartridge A is inserted a distance l ($l=d-r$) from the one-dot chain line position up to the solid line position after the opening of the shutter C, where r is the radius of the engage pin P and d is the depth of the notch L. To make the distance l sufficiently long, the depth d of the notch L is set to about 2.5 times the radius r of the engage pin P.

At the solid line position, the engage pin P receives the urging force n of the spring N of the rotary lever L and the returning force f of the shutter return spring F transferred from the side edge $C_1$ of the shutter C, thus is pressed against a side wall $I_1$ of the notch I.

The operation of ejection of the cartridge A is caused by releasing the engage pin P from the notch I. Specifically, in FIG. 16, this operation of ejection is rendered possible by pushing out the cartridge A more than the distance l in the direction of ejection in opposition to the frictional force between the engage pin P and the side wall $I_1$ of the notch I that results from the urging force n of the spring N and the frictional force between the engage pin P, the side edge $C_1$ of the shutter C, and the side wall $I_1$ of the notch I that results from the returning force f of the shutter return spring F. That is, upon releasing the locking of the eject lever Q, the eject lever Q is rotated counterclockwise by the urging force of the spring S, so that the eject pin T pushes the front edge h of the cartridge A in the direction of ejection. When the cartridge A moves past the one-dot chain line position because of the foregoing pushing, the engage pin P is released from the notch I to permit rotation of the rotary lever L, so that in response to the rotation of the eject lever Q, the holder J is moved to the raised position, and by the returning force of the shutter return spring F and the urging force of the spring N coupled to the rotary lever L, the cartridge A is ejected from the holder J.

In the foregoing cartridge A, when the shutter C is locked at the open position, the spring N of the rotary lever L is the longest and the returning force f of the shutter return spring F is the largest. Thus the engage pin P of the shutter operating unit is pressed against the side wall $I_1$ of the notch I with strong force. Therefore, to release the engage pin P from the notch I thereby to eject the cartridge A from the holder J, the spring S of the eject lever Q must be made so strong that the cartridge A can be pushed in the direction of ejection over more than the foregoing distance l with fairly strong force. However, where the spring S is made strong as described above, to rotate the eject lever Q in opposition to the urging force of the spring S at the time of insertion of the cartridge A, the cartridge A must be inserted into the holder J with fairly strong force; thus, operation of the cartridge A has an unpleasant feel.

SUMMARY OF THE INVENTION

It is an object of the present invention to provide a disk cartridge which can be inserted with soft control, giving an enhanced feeling of control.

To accomplish the foregoing object, the present invention provides a disk cartridge which comprises a hard jacket for rotatably accommodating a disc-shaped recording medium, which is formed with a head insert hole; a shutter attached to the hard jacket movably between the open position where the head insert hole is open and the closed position where it is closed; a spring for urging the shutter so as to position the shutter at the closed position; and a notch formed at the front edge of the hard jacket and defined by at least a bottom wall extending parallel to the front edge, and a side wall contiguous to the bottom wall and extending orthogonally to the front edge, which faces one side edge of the shutter standing at the open position, and is characterized in that the side wall of the notch is made contiguous to the front edge of the hard jacket by a corner wall whose distance from the one side edge of the shutter standing at the open position progressively increases as approaching the front edge of the hard jacket.

DESCRIPTION OF THE PREFERRED EMBODIMENTS

Embodiments of the present invention will now be described in greater detail with reference to the drawings.

Figure 1:
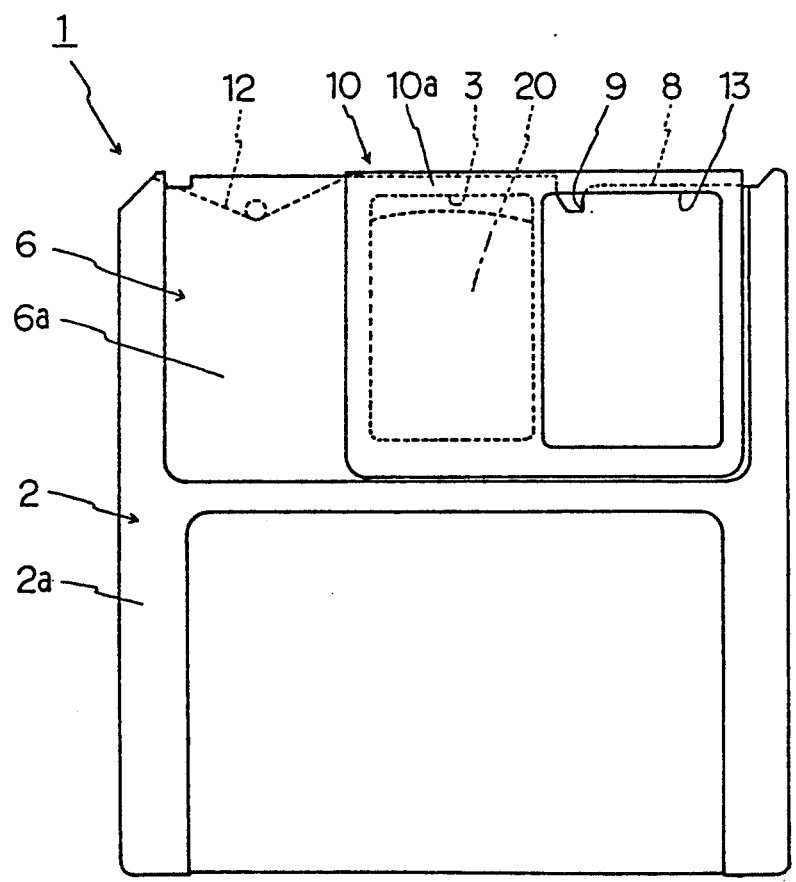
FIG. 1(a) is a top view of a magneto-optical disk cartridge according to an embodiment of the present invention, with its shutter is in the completely closed state.
FIG. 1(b) is a bottom view corresponding to FIG. 1(a)
Figure 1:
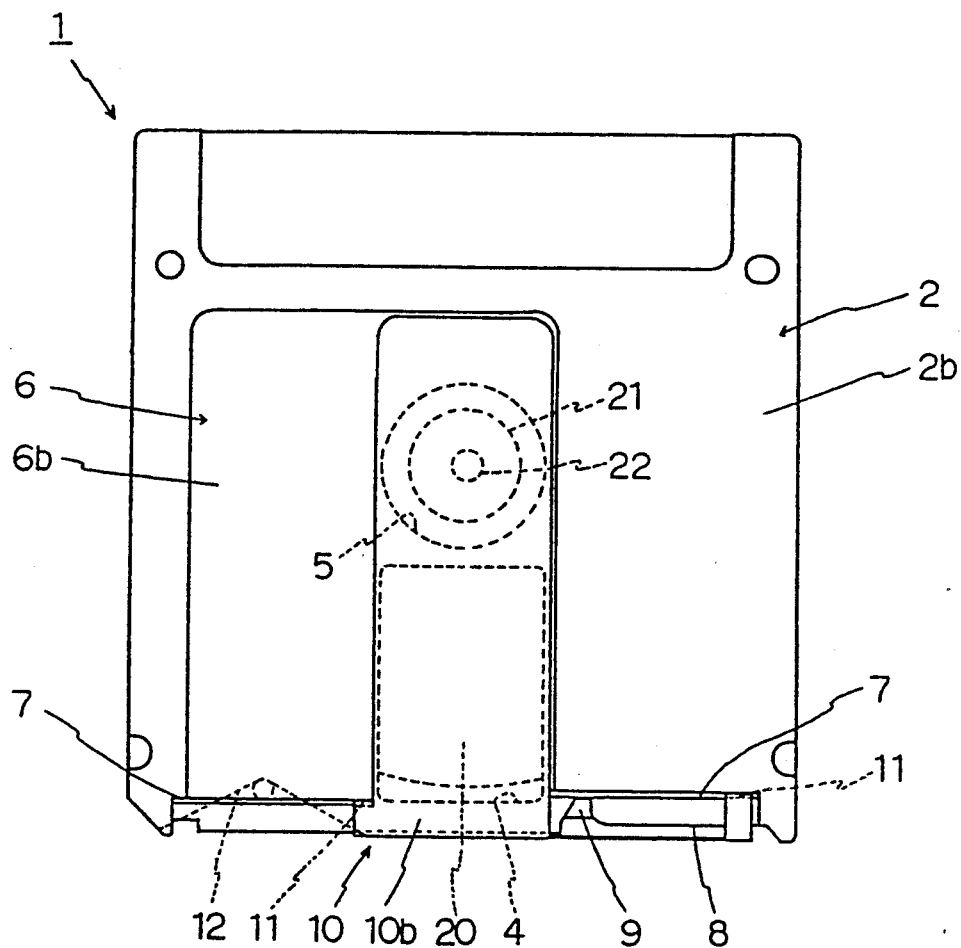
Figure 2:
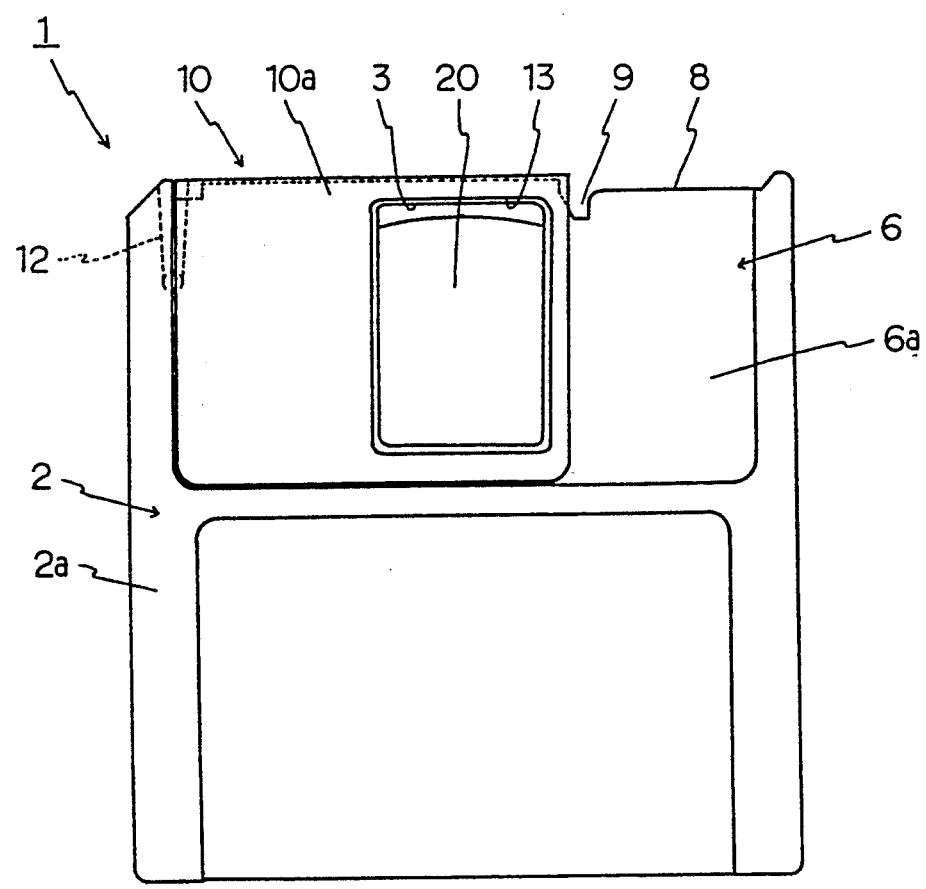
FIG. 2(a) is a top view of the above with the shutter in the completely open state.
FIG. 2(b) is a bottom view corresponding to FIG. 2(a)
Figure 2:
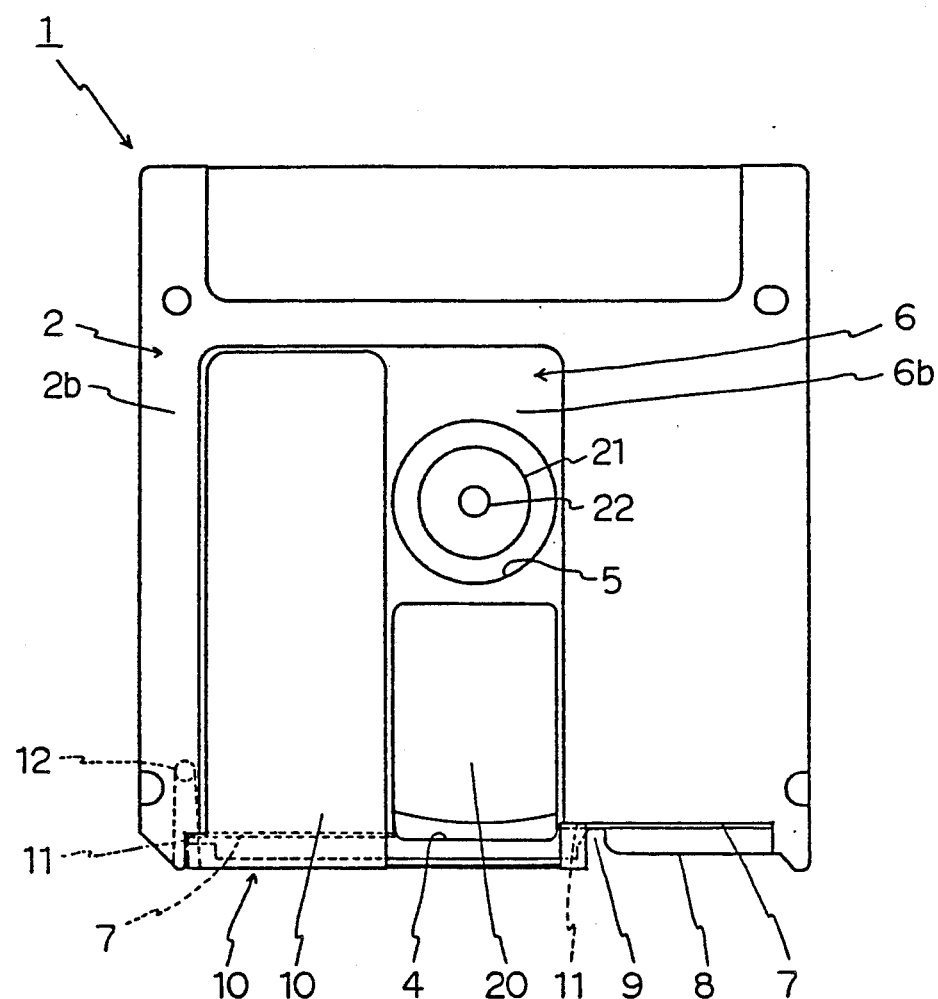

FIGS. 1(a), 1(b), 2(a) and 2(b) show an embodiment of a magneto-optical disk cartridge according to the present invention. FIGS. 1(a) and 1(b) are a top view and a bottom view of the magneto-optical disk cartridge whose shutter is in the completely closed state, and FIGS. 2(a) and 2(b) are a top view and a bottom view of the above with the shutter in the complete open state.

In these drawings, 20 is a magneto-optical disk, a metallic disc 21 is attached to a central portion of the disk 20, and a spindle insert hole 22 is formed at the center of the metallic disc 21.

A magneto-optical disk cartridge 1 (hereinafter referred to as the cartridge 1) is fundamentally identical in structure with a known 3.5 inch floppy disk cartridge, that is, the magneto-optical disk 20 is accommodated in a hard jacket 2 made of hard plastic or the like which has a comparatively flat shape.

On the side of a front edge 8 of the hard jacket 2, a bias magnet insert hole 3 and a head insert hole 4, extending radially of the magneto-optical disk 20 and having the same shape, are formed at opposite positions in an upper half 2a and a lower half 2b, respectively, of the hard jacket 2. A spindle insert hole 5 is formed in about a central portion of the lower half 2b to permit rotation of the magneto-optical disk 20.

Formed in a portion of the hard jacket 2 where the bias magnet insert hole 3, head insert hole 4 and spindle insert hole 5 are formed is a shutter mount section 6 in the form of a recess whose depth substantially corresponds to the thickness of a shutter 10. Shutter 10 is slidably seated in the shutter mount section 6. The shutter mount section 6 is made different in shape between the upper half 2a and the lower half 2b of the hard jacket 2 so as to conform to the shutter 10 being seated.

Specifically, a mount section 6a of the upper half 2a extends over the whole area of the hard jacket 2 inclusive of the bias magnet insert hole 3, except for lateral marginal portions of the upper half 2a, whereas a mount section 6b of the lower half 2b is narrower than the mount section 6a but is extended toward a rear edge of the hard jacket 2 so as to cover the head insert hole 4 and the spindle insert hole 5.

The shutter 10 is composed integrally of an upper segment 10a which is seated in the mount section 6a of the upper half 2a of the hard jacket 2 and a lower segment 10b which has a width corresponding to about one-half that of the upper segment 10a and is extended toward the rear edge of the hard jacket 2 so as to be seated in the mount section 6b of the lower half 2b. The shutter 10 is seated in the shutter mount section 6 slidably in the widthwise direction of the hard jacket 2 while pinching the upper half 2a and lower half 2b of the hard jacket 2. Specifically, the lower half 2b is formed with straight guide grooves 7, 7 close to and along the front edge, whereas the lower segment 10b of the shutter 10 is partially bent inward by pressing or the like to form pawl protrusions 11, 11 which are fitted in the guide grooves 7, 7. The shutter 10 is always urged by a shutter return spring 12 toward the closed position shown in FIGS. 1(a) and 1(b). In the closed position, the bias magnet insert hole 3 of the upper half 2a is closed by the upper segment 10a of the shutter 10, while the head insert hole 4 and the spindle insert hole 5 of the lower half 2b are closed by the lower segment 10b. The upper segment of the shutter 10 is additionally formed with a shutter opening 13. Therefore, when the shutter 10 is moved to the open position shown in FIGS. 2(a) and 2(b), the shutter opening 13 comes into alignment with the bias magnet insert hole 3 on the side of the upper half 2a, while on the side of the lower half 2b, the lower segment 10b comes into the position where the head insert hole 4 and the spindle insert hole 5 are open, and the recording surface of the magneto-optical disk 20 and the metallic disc 21 attached to the central portion thereof are exposed, whereby recording and reproducing are rendered possible.

Figure 3:
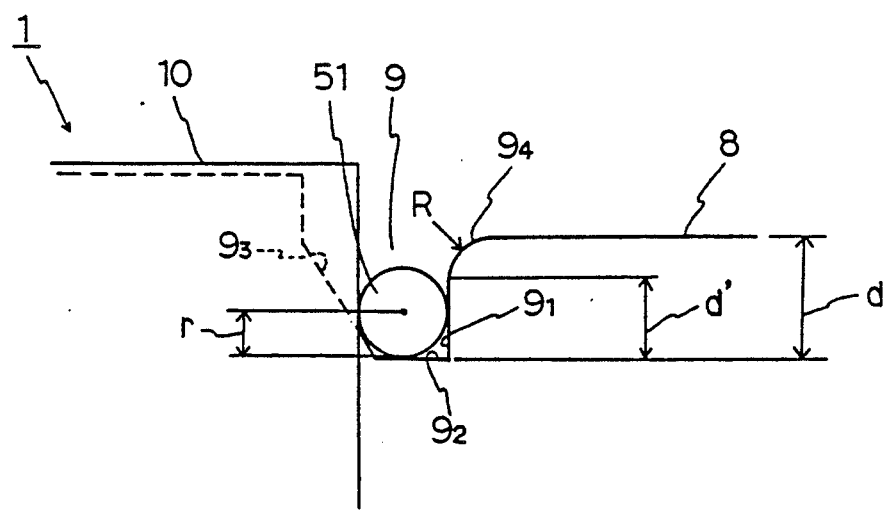
FIG. 3 is a fragmentary schematic diagram explanatory of the magneto-optical disk cartridge.

The front edge 8 of the hard jacket 2 is formed with a notch 9 for locking the shutter 10 in the open position shwon in FIGS. 2(a) and 2(b). As shown in FIG. 3 in greater detail, the notch 9 is defined by a side wall $9_1$, a bottom wall $9_2$, an inclined wall $9_3$, and a corner wall $9_4$ formed by intersection of the side wall $9_1$ with the front edge 8 of the hard jacket 2. The corner wall $9_4$ is curved with a radius R. To prevent an engage pin 51, hereinafter described, from coming out of the notch 9, the radius R is set so as to meet the relationship of $R < d - r$ while making the depth d' of the side wall $9_1$ satisfy the relationship of $r < d' < d$, where r is the radius of the engage pin 51 and d is the depth of the notch 9. In one embodiment, the radius R is set to 1.2 mm.

In the cartridge 1 of the embodiment wherein the depth d of the notch 9 is 3.3 mm and the radius r of the engage pin 51 is 1.25 mm, it is sufficient to set the radius R to an arbitrary value within the range of $R < 2.05$.

An example of a shutter operating unit for automatic opening and closing of the shutter 10 of the cartridge 1 will be described with reference to FIGS. 4 through 11. In these drawings, the arrow X designates the direction of insertion of the cartridge 1 and the arrow Y designates the direction of ejection.

The shutter operating unit is composed of a base chassis 30 which is a unit body, a holder 40 supported on the base chassis 30 for accommodation of the cartridge 1 (not shown), and a slide plate 60 for lifting the holder 40 up and down with respect to the base chassis 30 in response to the operation of insertion/ejection of the cartridge 1.

The lateral edges of the base chassis 30 are provided with paired vertical guides 32L, 32R for guiding of guide rollers 42L, 42R attached to side plates 41L, 41R of the holder 40.

Figure 4:
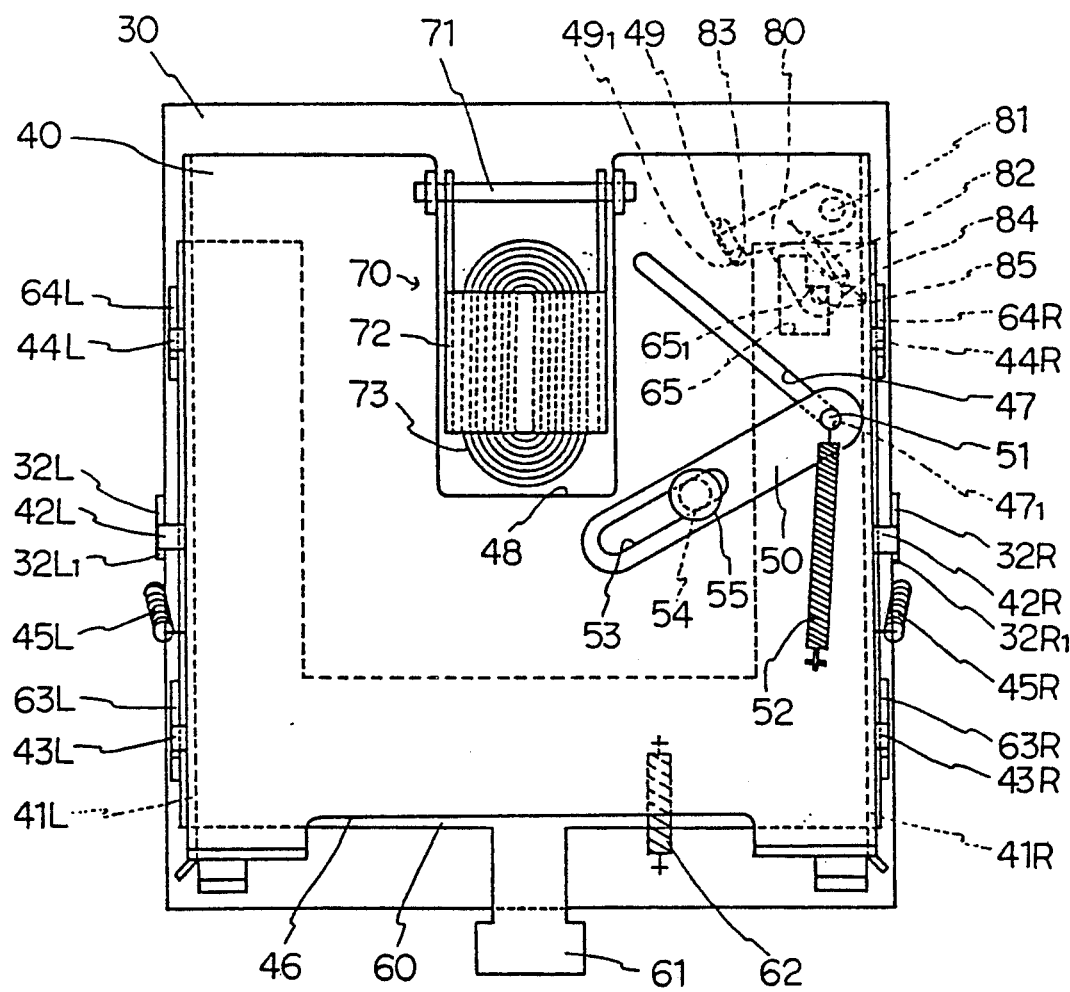
FIG. 4 is a plan view showing a shutter operating unit of the magneto-optical disk cartridge.
Figure 5:
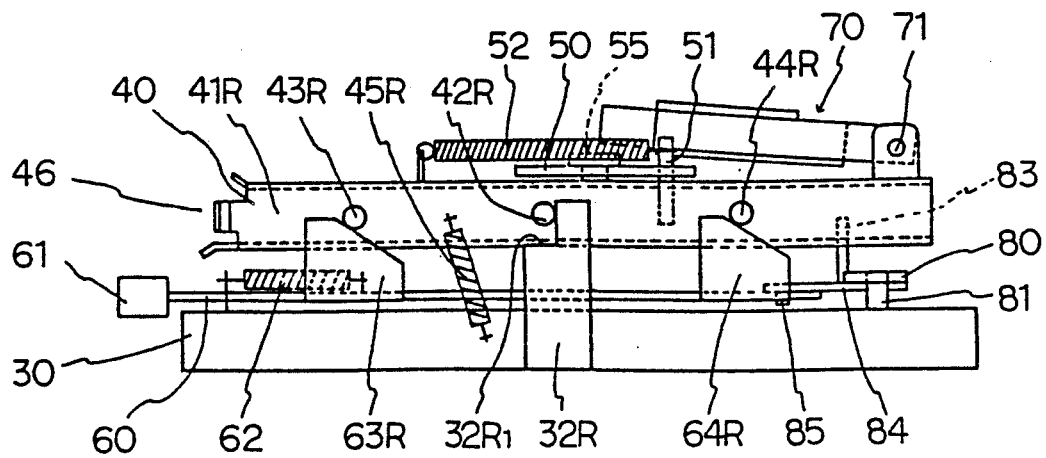
FIG. 5 is a right side view corresponding to FIG. 4.

The slide plate 60 is a substantially U-shaped plate member, which has a control portion 61 at one end thereof and is supported by a guide mechanism (not shown) slidably on the base chassis 30 in the direction of insertion/ejection of the cartridge 1. The slide plate 60 is always urged in the direction of ejection by a spring 62 stretched between it and the base chassis 30, but in FIGS. 4 and 5 is locked at the retracted position after being pushed in the direction of insertion by a slide plate lock lever 84 hereinafter described. The lateral edges of the slide plate 60 are further provided with paired inclined guides 63L, 63R and 64L, 64R for guiding guide rollers 43L, 43R and 44L, 44R attached to the side plates 41L, 41R of the holder 40.

The holder 40 is liftable in response to the sliding of the slide plate 60 between the raised position where it is spaced apart from the base chassis 30 to permit insertion/ejection of the cartridge 1 and the depressed position where it approaches the base chassis 30 to render recording and reproducing possible. FIGS. 4 and 5 show the holder 40 at the raised position. That is, in this state, the holder 40 is stably held at the raised position in opposition to the urging force of springs 45L, 45R stretched between it and the base chassis 30 with the guide rollers 43L, 43R and 44L, 44R supported by the inclined guides 63L, 63R and 64L, 64R of the slide plate 60 and with the guide rollers 42L, 42R pressed against the vertical guides 32L, 32R of the base chassis 30.

The holder 40 has an inner space for accommodation of the cartridge 1, and a cartridge insert slot 46 at an end on the ejection side. A rotary lever 50, and mounted on the upper surface of the holder 40, and has an engage pin 51 secured to its distal end that projects up and down therefrom. A downward protruding portion of the engage pin 51 projects into the inside of the holder 40 after passing through a guide slit 47 which is formed in the upper surface of the holder 40 and extends at an angle of about 45° to the direction of insertion of the cartridge 1. A spring 52 is stretched between an upward protruding portion of the pin 51 and the upper surface of the holder 40, so that the engage pin 51 is urged into a position at one end $47_1$ of the guide slit 47. On the other hand, the other end of the rotary lever 50 includes an elongate hole 53 for receiving a guide pin 54 vertically provided on the upper surface of the holder 40. The upper end of the guide pin 54 is topped with a cap 55, so that the guide pin 54 is prevented from coming off the rotary lever 50 but is guided for free movement by the elongate hole 53.

An opening portion 48 is formed in the upper surface of the holder 40 close to the front edge on the insertion side, and a bias magnet 70, rotatable about a shaft 71, is disposed to face the opening portion 48. The bias magnet 70 is composed of a core 72 and a coil 73 wound therearound, which, when the holder 40 is at the raised position, is retracted above the holder as shown in FIG. 5 so as not to disturb the insertion of the cartridge 1. When the cartridge 1 is inserted and the holder 40 is moved to the depressed position, is rotated counterclockwise about the shaft 71 by a rotary mechanism (not shown), so that the bias magnet 70 faces the opposite side of the recording surface of the disk through the opening portion 48.

A cartridge eject lever 80 is rotatably supported at one end by a shaft 81 on the base chassis 30 and urged counterclockwise by a spring 82. An eject pin 83 vertically disposed at the other end of cartridge eject lever 80. The eject pin 83 projects into the inside of the holder after passing through a guide slit 49 formed in the under surface of the holder 40. Eject pin 83 is normally urged to one end $49_1$ of the guide slit 49 by the urging force of the spring 82. On the other hand, slide plate lock lever 84 is integrally attached at one end to the cartridge eject lever 80 so that it can rotate about the shaft 81 together with the cartridge eject lever 80. An engage pin 85, extending downward from the other end of the slide plate lock lever 84, passes through a substantially L-shaped slit 65 formed in the slide plate 60. In the normal position shown in FIG. 10, engage pin 85 stepped portion $65_1$, so that the engage pin 85 locks the slide plate 60 at the position shown in opposition to the urging force of spring 62.

The operation of opening/closing of the shutter 10 in response to insertion/ejection of the cartridge 1 with respect to a recording and reproducing apparatus will be described.

Figure 6:
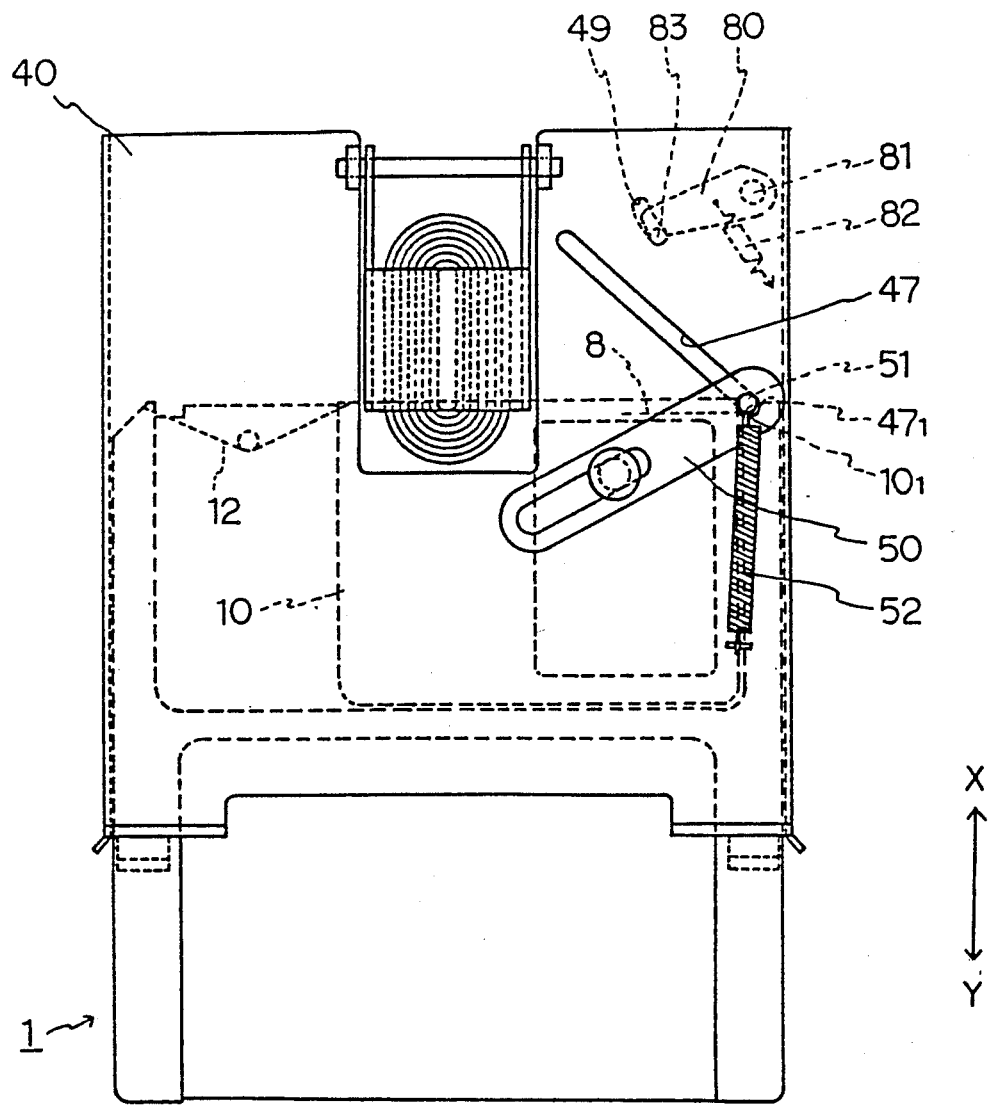
FIG. 6 is a plan view of the magneto-optical disk cartridge inserted midway into the unit of FIG. 4.

When the cartridge 1 is gradually inserted into the holder 40 held at the raised position shown in FIG. 6, the front edge 8 of the cartridge 1 and one side edge $10_1$ of the shutter 10 come into contact with the engage pin 51 that is disposed at end $47_1$ of the guide slit 47. When the cartridge 1 is further inserted from the foregoing position, the engage pin 51 is pushed by the front edge 8 of the cartridge 1 and gradually moved obliquely inward in opposition to the spring 52 while being guided by the guide slit 47, and in response to the foregoing, the one side edge $10_1$ of the shutter 10 is pushed by the engage pin 51 so that the shutter 10 is gradually slid leftward in the drawing in opposition to the returning force of the shutter return spring 12. When the engage pin 51 reaches the position of the notch 9 of the cartridge 1 in response to the insertion of the cartridge 1, the engage pin 51 begins to fall into the notch 9 while being guided by the corner wall $9_4$. At the position shown in FIG. 7, engage pin 51 completely fits into notch 9, so that the shutter 10 is locked in the open position. In the locked state, with shutter 10 in the open position illustrated by the solid lines in FIG. 9, the engage pin 51 receives the returning force of the shutter return spring 12 from the side edge $10_1$ of the shutter 10 and a component 51' in the moving direction of the shutter 10 of the urging force of the spring 52, so that the engage pin 51 is pressed against the side wall $9_1$ of the notch 9.

Figure 11:
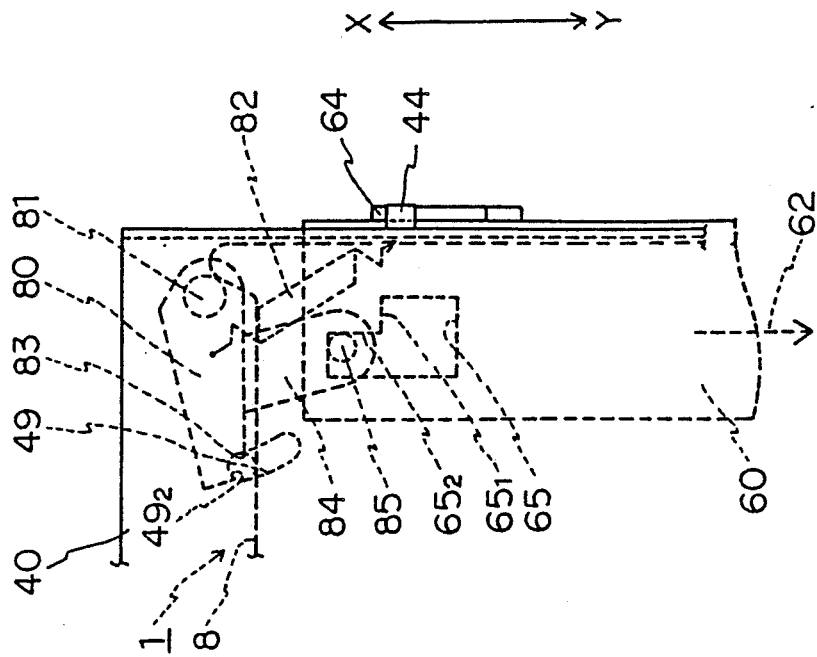
FIGS. 10 and 11 are schematic diagrams explanatory of the locking operation of a slide plate forming part of the unit of FIG. 4.
Figure 10:
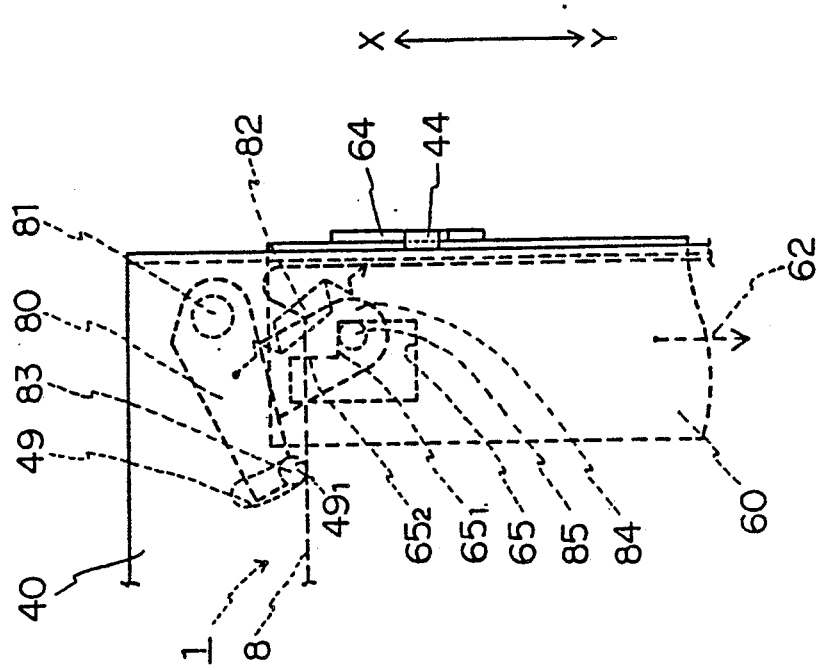

The cartridge eject lever 80 is shown in FIGS. 10 and 11 in greater detail. In response to the insertion of the cartridge 1, the eject in 83 is pushed by the front edge of the cartridge 1 and rotated clockwise about the shaft 81 in opposition to the urging force of the spring 82. As a result, the slide plate lock lever 84 is also rotated clockwise together with the cartridge eject lever 80, the engage pin 85 is disengaged from the stepped portion $65_1$ of the guide slit 65, and the slide plate 60 is released from the locked state and slid in the direction of ejection by the urging force of the spring 62. Therefore, the engage pin 85 is pressed against a wall portion $65_2$ of the guide slit 65 by the urging force of the spring 82, and the cartridge eject lever 80 is locked at the position where its eject pin 83 is in contact with the other end $49_2$ of the guide slit 49.

Figure 7:
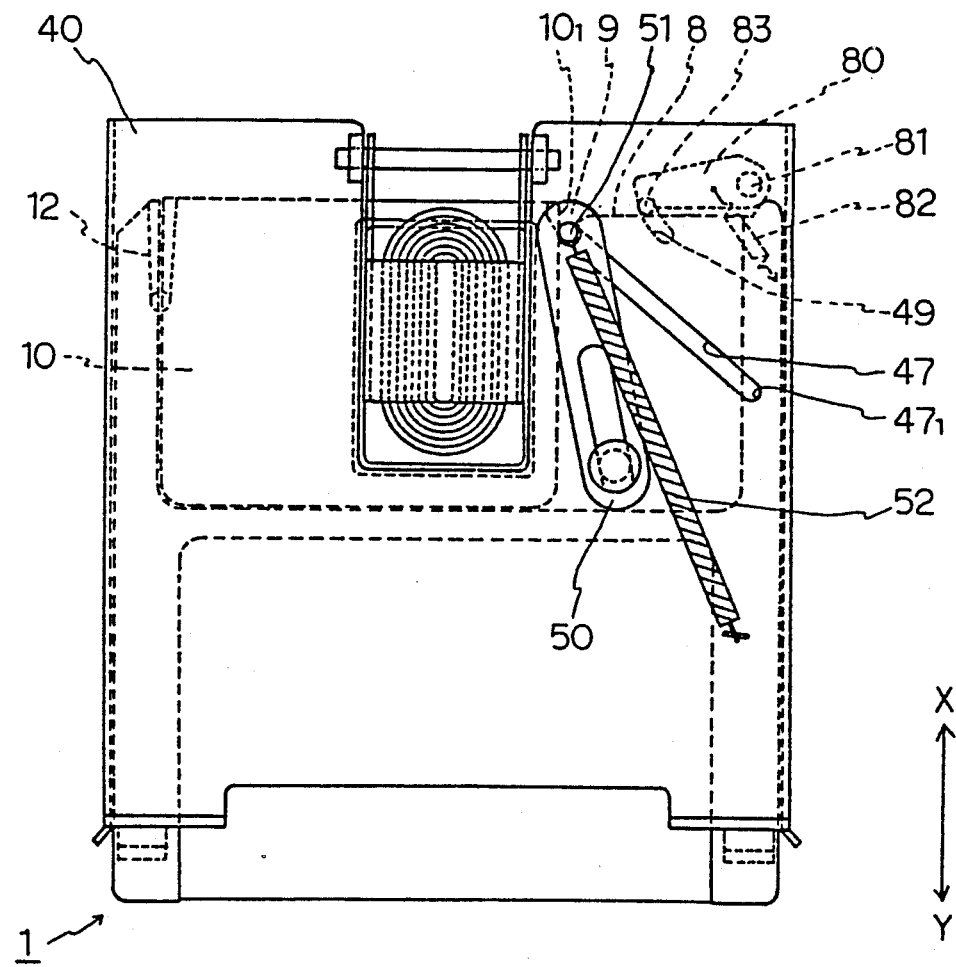
FIG. 7 is a plan view of the magneto-optical disk cartridge inserted completely into the unit of FIG. 4.
Figure 8:
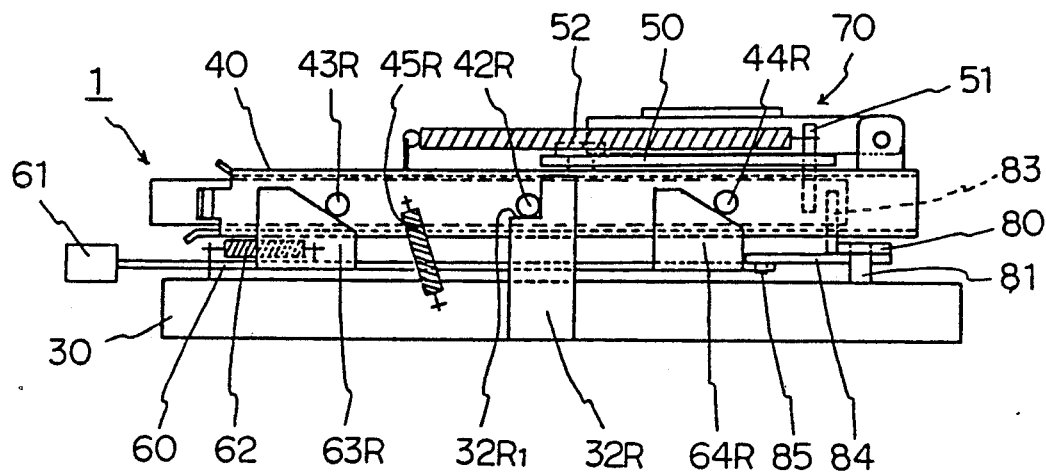
FIG. 8 is a right side view of the shutter operating unit of FIG. 4, whose holder is at the depressed position.

In this way, when the slide plate 60 is slid in the direction of ejection, the holder 40 is moved down toward the base chassis 30 by the urging force of the springs 45L, 45R while the guide rollers 43L, 43R and 44L, 44R are being guided by the inclined guides 63L, 63R and 64L, 64R, thereby taking the depressed position shown in FIGS. 7 and 8. At this position, since the movement of the holder 40 in the sliding direction of the slide plate 60 is restricted by contact of the guide rollers 42L, 42R with the vertical guides 32L, 32R, the holder 40 moves down parallel to the base chassis 30.

To perform the ejection of cartridge 1 from the holder 40 under the condition that the holder 40 is in the depressed position shown in FIGS. 7 and 8, the control portion 61 is pressed, so that the slide plate 60 is slid in the direction of insertion in opposition to the urging force of the spring 62. As a result, in accordance with the reverse procedure to that performed at the time of insertion, the engage pin 85 again engages the stepped portion $65_1$ of the guide slit 65, the slide plate 60 is locked at the pushed position, and the holder 40 is moved to the raised position shown in FIGS. 5 and 6.

Figure 9:
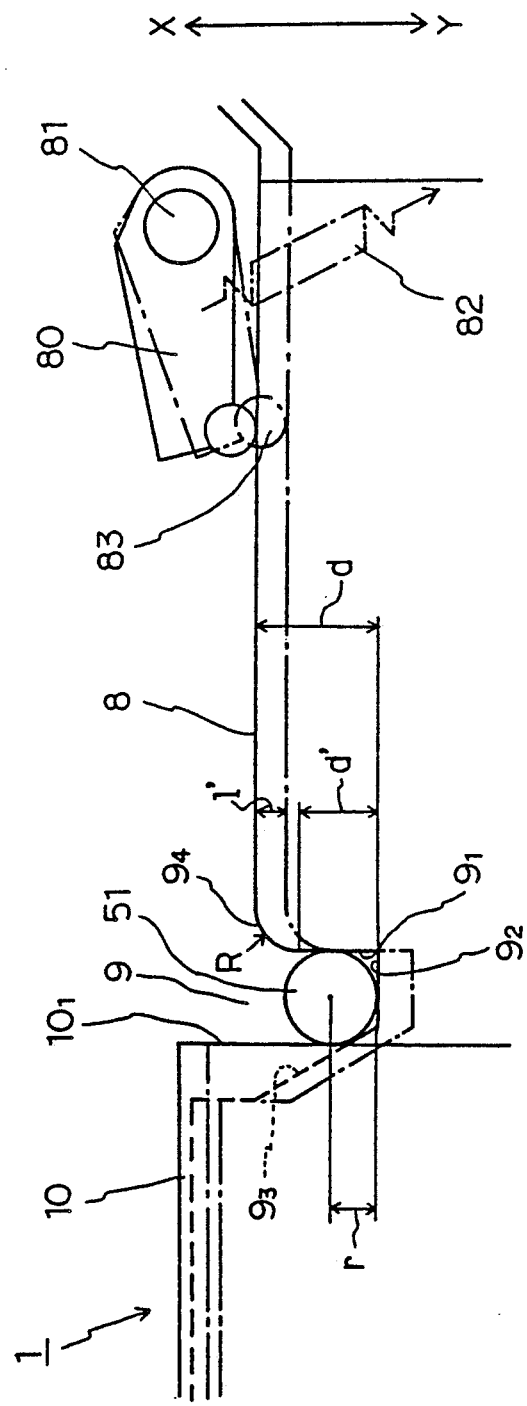
FIG. 9 is a schematic diagram explanatory of the operation of insertion/ejection of the magneto-optical disk cartridge with respect to the unit of FIG. 4.

Further, when the engage pin 85 engages the stepped portion $65_1$, the slide plate lock lever 84 is rotated counterclockwise by the urging force of the spring 82, so that the eject pin 83 pushes the front edge 8 of the cartridge 1 in the direction of ejection. As shown in FIG. 9 in greater detail, when the foregoing pushing moves the cartridge 1 from the solid line position past the one-dot chain line position or the engage pin 51 is moved from a position completely fitting in the notch 9 by more than the distance l' (l' = d - r - R) in the direction of ejection, the shutter 10 begins sliding, so that the shutter 10 is moved rightward in the drawing by the return force of the shutter return spring 12. As a result, the engage pin 51 is ejected from the notch 9 while being guided by the corner wall $9_4$, and returned to the position at the one end $47_1$ of the guide slit 47 while pushing the front edge 8 of the cartridge 1 in the direction of ejection by means of the urging force of the spring 52 and the returning force of the shutter return spring 12. When the state of FIG. 6 is reached, the cartridge 1 is partly ejected from the holder 40.

As described above, according to the cartridge 1 of the embodiment, the notch 9 is provided with the corner wall $9_4$ of given radius R; thus, it is possible without changing the depth d of the notch 9 to make the distance l' very short along which, when it is desired to eject the engage pin 51 from the notch 9 thereby to eject the cartridge 1 from the apparatus, the cartridge eject lever 80 pushes the cartridge 1 in the direction of ejection in opposition to the frictional force between the engage pin 51 and the side edge $10_1$ of the shutter 10 as well as the side wall $9_1$ of the notch 9. Therefore, inevitably, the spring 82 for the cartridge eject lever 80 be weak in strength, whereby the cartridge eject lever 80 can be readily rotated in opposition to the urging force of the spring 82 when the cartridge 1 is inserted into the apparatus.

Figure 12:
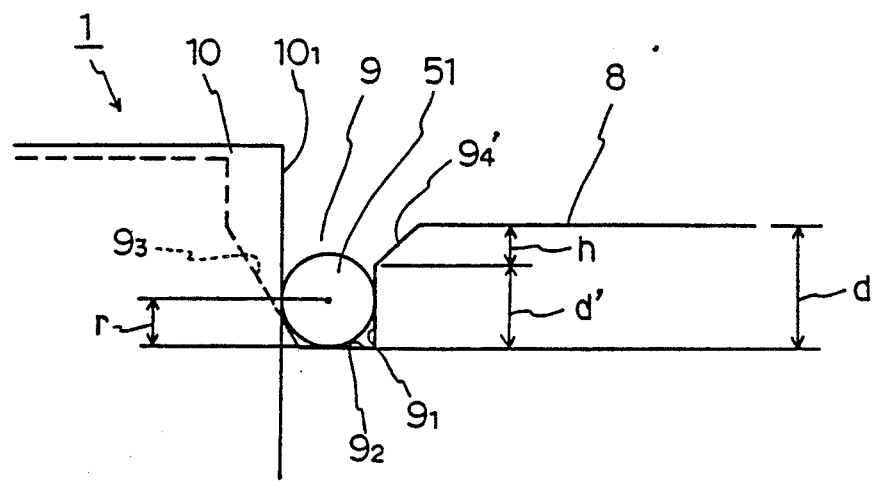
FIG. 12 is a schematic diagram explanatory of another embodiment of the magneto-optical disk cartridge according to the present invention.
Figure 13:
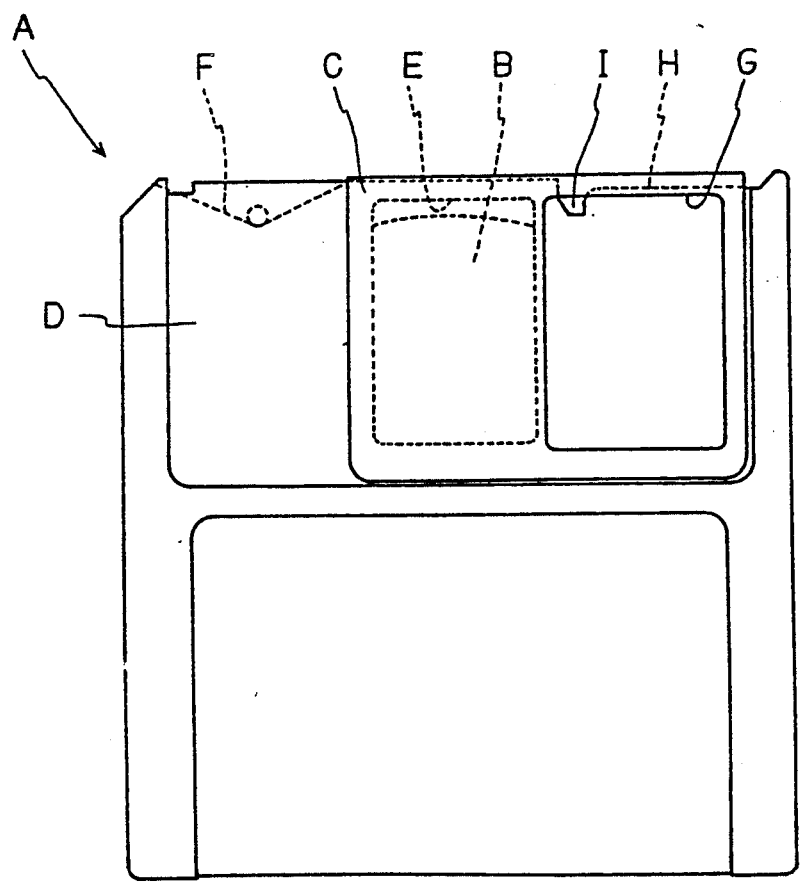
FIGS. 13 and 14 are plan views of a conventional magneto-optical disk cartridge.
Figure 14:
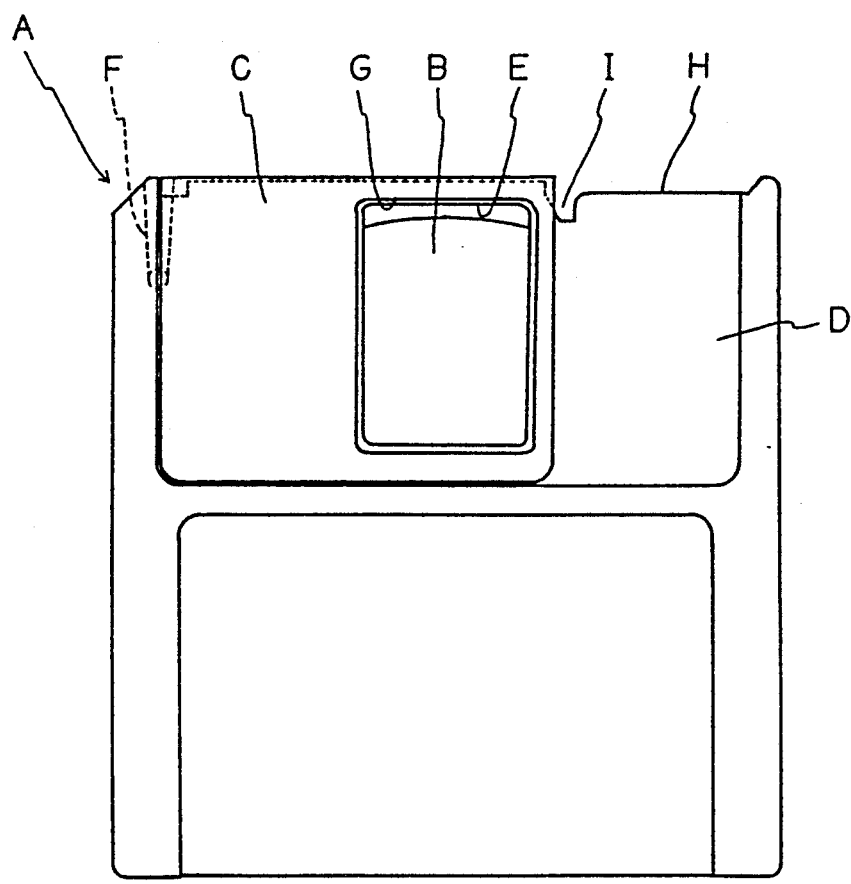
Figure 15:
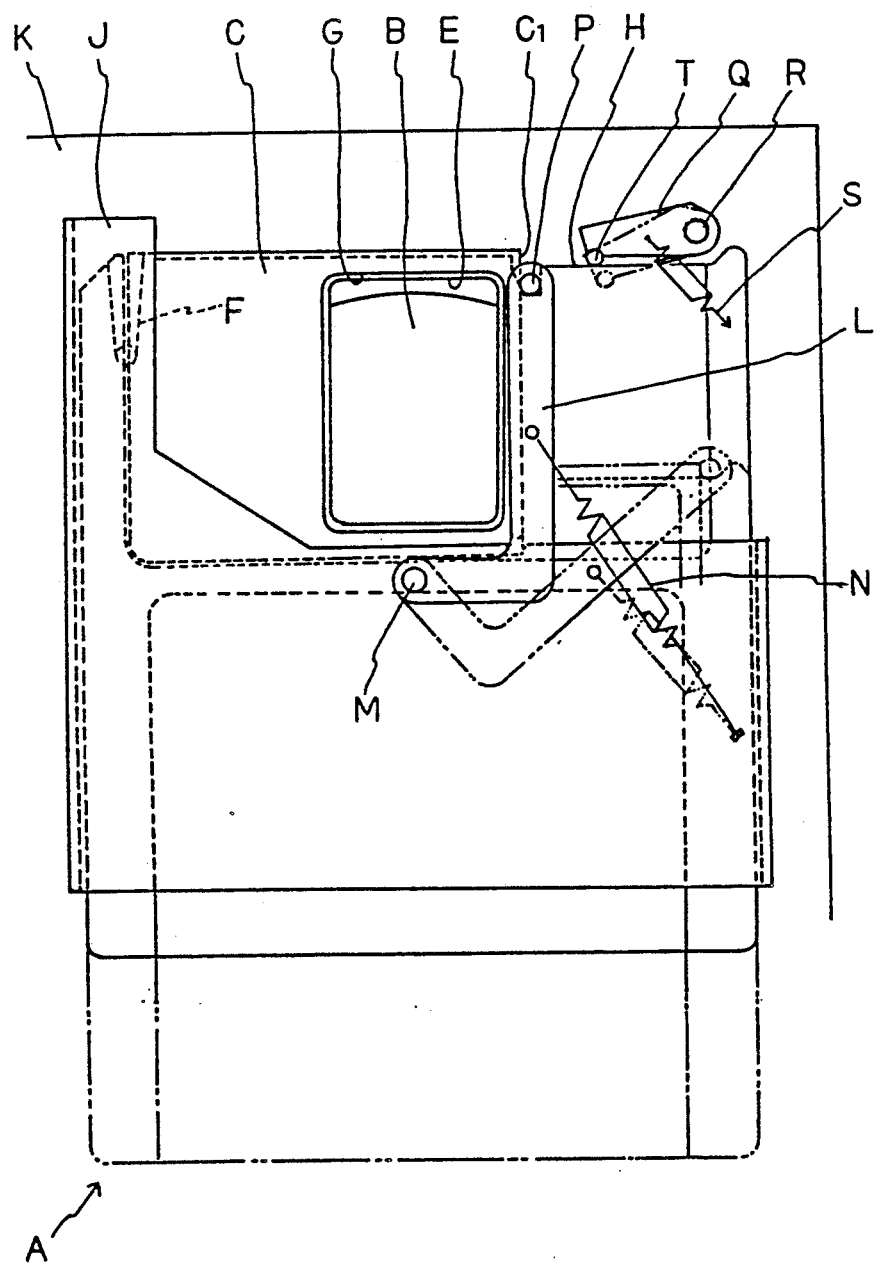
FIG. 15 is a plan view showing a conventional shutter operating unit.
Figure 16:
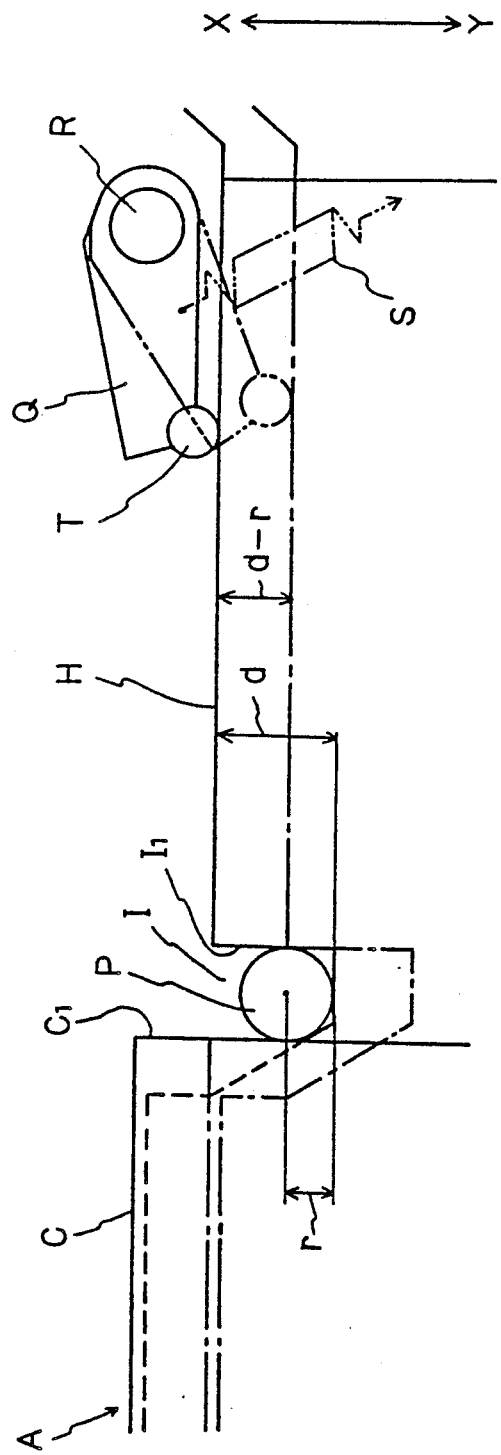
FIG. 16 is a schematic diagram explanatory of the operation of insertion/ejection of the magneto-optical disk cartridge with respect to the unit of FIG. 15.

The present invention should not be limited to the foregoing embodiment. For example, as shown in FIG. 12, instead of providing a curved corner wall $9_4$ of the notch 9, the corner between the front edge 8 of the hard jacket 2 and the side wall $9_1$ may be cut off along an oblique straight line to leave an inclined surface or a corner wall 9₄'. In this case, the size h of the corner wall 9₄ in the direction of insertion of the cartridge 1 is set to an arbitrary value within the range of h<d−r.

Although the embodiment has been described in the environment of a magneto-optical disk cartridge, the present invention should not be limited to the above type and can be applied to a known disk cartridge for accommodation of a floppy disk or the like.

Although the embodiment has been described as a 3.5 inch disk cartridge, the present invention should not be limited to the above size and can be applied to a 5 inch disk cartridge.

As described above, the disk cartridge according to the present invention can be inserted into the apparatus through soft operation, giving an enhanced feeling of control.

What is claimed is:

1. A disk cartridge comprising:
 a hard jacket for rotatably accommodating a disc-shaped recording medium;
 a head insert hole in said jacket;
 a shutter attached to said hard jacket movable generally linearly between an open position where the head insert hole is open and a closed position where it is closed;
 a spring for urging the said shutter toward said closed position;
 a notch at a front edge of said hard jacket;
 said notch including at least a bottom wall and a side wall contiguous to said bottom wall and extending orthogonally to said front edge, which faces one side edge of said shutter when said shutter is in said open position;
 said side wall of the notch is connected to said front edge of said hard jacket by a corner wall whose distance from the one side edge of the shutter standing at the open position progressively increases as it approaches said front edge of the hard jacket;
 said notch being effective for accepting an engaging means for locking said shutter at said open position;
 said engaging means, in its engaging position, contacting said side wall at a distance r above said bottom wall; and
 said corner wall beginning at least said distance r above said bottom wall, whereby said engaging means contacts said side wall, when in its engaging position.

2. A disk cartridge comprising:
 a hard jacket for rotatably accommodating a disc-shaped recording medium;
 said hard jacket including a head insert hole;
 a shutter attached to said hard jacket movable generally linearly between an open position where said head insert hole is open and a closed position where it is closed;
 a spring for urging said shutter toward said closed position;
 a notch at a front edge of said hard jacket;
 said notch including at least a bottom wall and a side wall contiguous to said bottom wall and orthogonally to said front wall;
 said side wall faces one side edge of said shutter standing at the open position;
 said side wall of the notch is connected to said front edge of said hard jacket by a corner wall whose distance from the one side edge of the shutter standing at the open position progressively increases as it approaches said front edged of the hard jacket;
 said notch being effective to receive an engaging pin of a shutter opening means;
 said engaging pin contacting said side wall at a distance r above said bottom wall, when said engaging pin is in its engaging position;
 said corner wall joining said side wall at a distance d' above said bottom wall; and
 said distance d' being substantially greater than said distance r, whereby said engaging pin contacts said side wall, when said engaging pin is in its engaging position.

3. A disk cartridge according to claim 2, wherein said corner wall is curved with a radius R.

4. A disk cartridge according to claim 2 wherein said corner wall is straight and inclined with respect to the side wall.

* * * * *